US012743142B2

(12) United States Patent
Jonnalagadda et al.

(10) Patent No.: US 12,743,142 B2

(45) Date of Patent: Sep. 22, 2026

(54) AUTONOMOUS MEMORY POWER COLLAPSE

(71) Applicant: QUALCOMM INCORPORATED, San Diego, CA (US)

(72) Inventors: Vijay Jonnalagadda, San Diego, CA (US); Pankaj Kumar Sharma, Bangalore (IN); Madhusudhana Reddy Lebaka, Bangalore (IN); Wesley James Holland, Encinitas, CA (US); Anirudh Ghayal, Secunderabad (IN); Venkatesh Ravipati, Guntur (IN); Jimit Shah, Bangalore (IN); Girish Bhat, San Diego, CA (US); Subbarao Palacharla, San Diego, CA (US); Hiral Nandu, South San Francisco, CA (US); Shubham Agarwal, Bangalore (IN); Lakshmi Narayana Panuku, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 91 days.

(21) Appl. No.: 18/977,776

(22) Filed: Dec. 11, 2024

(65) Prior Publication Data

US 2026/0161209 A1 Jun. 11, 2026

(51) Int. Cl.
*G06F 1/26* (2006.01)
*G06F 1/3234* (2019.01)
*G06F 1/3287* (2019.01)
*G06F 1/3296* (2019.01)

(52) U.S. Cl.
CPC ................ *G06F 1/26* (2013.01); *G06F 1/263* (2013.01); *G06F 1/3234* (2013.01); *G06F 1/3287* (2013.01); *G06F 1/3296* (2013.01)

(58) Field of Classification Search
CPC ...... G06F 1/263; G06F 1/3234; G06F 1/3287; G06F 1/26; G06F 1/3296
See application file for complete search history.

(56) References Cited

U.S. PATENT DOCUMENTS

| | | | | |
|---|---|---|---|---|
| 11,493,986 | B2 * | 11/2022 | Rangarajan | G06F 1/3243 |
| 2016/0306412 | A1 * | 10/2016 | Kolla | G06F 1/263 |
| 2017/0085253 | A1 * | 3/2017 | Cao | H03K 3/012 |
| 2018/0267598 | A1 * | 9/2018 | Pulivendula | G06F 1/3206 |

* cited by examiner

*Primary Examiner* — Terrell S Johnson

(74) *Attorney, Agent, or Firm* — SMITH TEMPEL BLAHA LLC

(57) ABSTRACT

Power control in a computing device may include timing a periodic time interval associated with intervals of memory accesses by a first processor alternating with intervals of inactivity of the first processor, and powering down memory controller circuitry during the intervals of first processor inactivity while maintaining power supplied to a system-level cache. Maintaining the power supplied to the system-level cache may allow a second processor to continue accessing the system-level cache even while the memory controller circuitry is powered down. Power may be restored to the memory controller circuitry during the intervals of memory access by the first processor.

20 Claims, 5 Drawing Sheets

AUTONOMOUS MEMORY POWER COLLAPSE

DESCRIPTION OF THE RELATED ART

A computing device may include components such as processors, memory, input and output components, etc. Wireless computing devices may also include radio transceivers. The multiple components may be integrated on a "system-on-a-chip" (SoC). Mobile computing devices, such as cellular handsets, automotive computing devices, so-called "Internet-of-Things" devices, wearable devices, etc., may include SoCs. As mobile computing devices may be battery powered, they may incorporate power-saving techniques. A common power-saving technique involves placing the SoC into a low-power mode during a period of processing inactivity.

In a low-power mode, a power supply rail to an inactive component may be "collapsed" or turned off. For example, one or more power rails supplying a processor, a memory, a memory controller, a system-level cache, etc., may be collapsed. In the case of memory, a dynamic random access memory (DRAM) may be placed in a low-power mode known as self-refresh mode instead of being completely powered off. In self-refresh mode, the DRAM refreshes its storage array independently of the DRAM controller and its associated DRAM physical interface, which may be powered off. In such a low-power mode, neither the DRAM nor the system-level cache is accessible to other processors or subsystems that may remain powered.

In some use cases, processing inactivity may be periodic. For example, in a use case in which data is gathered from a sensor such as a camera, stored in a memory (controlled by a memory controller), and then rendered on a screen, a central processing unit (CPU) may be active for a time interval to process the incoming data and access the DRAM, and then become inactive for another time interval during which another processor (e.g., in a multimedia subsystem) may control the rendering. The rendering may utilize a system-level cache (SLC) to buffer data that had been read from the DRAM into the SLC prior to the CPU becoming inactive. This pattern may occur repeatedly, with the CPU alternating between intervals of activity and inactivity at a constant rate or period for the duration of the use case. As the SLC may be closely tied to the DRAM, the memory controller, and the memory controller physical interface, all of these components may remain powered for the duration of the use case, even during the intervals in which the DRAM is not being accessed. In a portable computing device, maintaining components in a powered state even while some are not being utilized may inefficiently consume power and ultimately reduce device run time.

SUMMARY OF THE DISCLOSURE

Systems, methods, and other examples of power control in a computing device are disclosed.

An exemplary method for power control in a computing device may include timing a periodic time interval. The method may further include collapsing at least one power rail, including a memory power rail supplying power to memory controller circuitry, after a first portion of the periodic time interval associated with access of a memory by a first processor. The method may still further include restoring the power supplied to the memory controller circuitry after a second portion of the periodic time interval following the first portion. The method may repeat for any number of successive periodic time intervals.

An exemplary system for power control in a computing device may include timer circuitry and power control circuitry. The timer circuitry may be configured to time a periodic time interval. The power control circuitry may be configured to collapse at least one power rail, including a memory power rail supplying power to memory controller circuitry, after a first portion of the periodic time interval associated with access of a memory by a first processor. The power control circuitry may be further configured to restore the power supplied to the memory controller circuitry after a second portion of the periodic time interval following the first portion.

An exemplary system-on-a-chip (SoC) may include a plurality of processors, a system-level cache, timer circuitry, and power control circuitry. The timer circuitry may be configured to time a periodic time interval. The power control circuitry may be configured to collapse at least one power rail, including a memory power rail supplying power to memory controller circuitry, after a first portion of the periodic time interval associated with access of a memory by a first processor. The power control circuitry may be further configured to restore the power supplied to the memory controller circuitry after a second portion of the periodic time interval following the first portion.

BRIEF DESCRIPTION OF THE DRAWINGS

In the Figures, like reference numerals refer to like parts throughout the various views unless otherwise indicated. For reference numerals with letter character designations such as "101A" or "101B", the letter character designations may differentiate two like parts or elements present in the same Figure. Letter character designations for reference numerals may be omitted when it is intended that a reference numeral encompass all parts having the same reference numeral in all Figures.

DETAILED DESCRIPTION

The word "exemplary" is used herein to mean "serving as an example, instance, or illustration." The word "illustrative" may be used herein synonymously with "exemplary." Any aspect described herein as "exemplary" is not necessarily to be construed as preferred or advantageous over other aspects.

Figure 1:
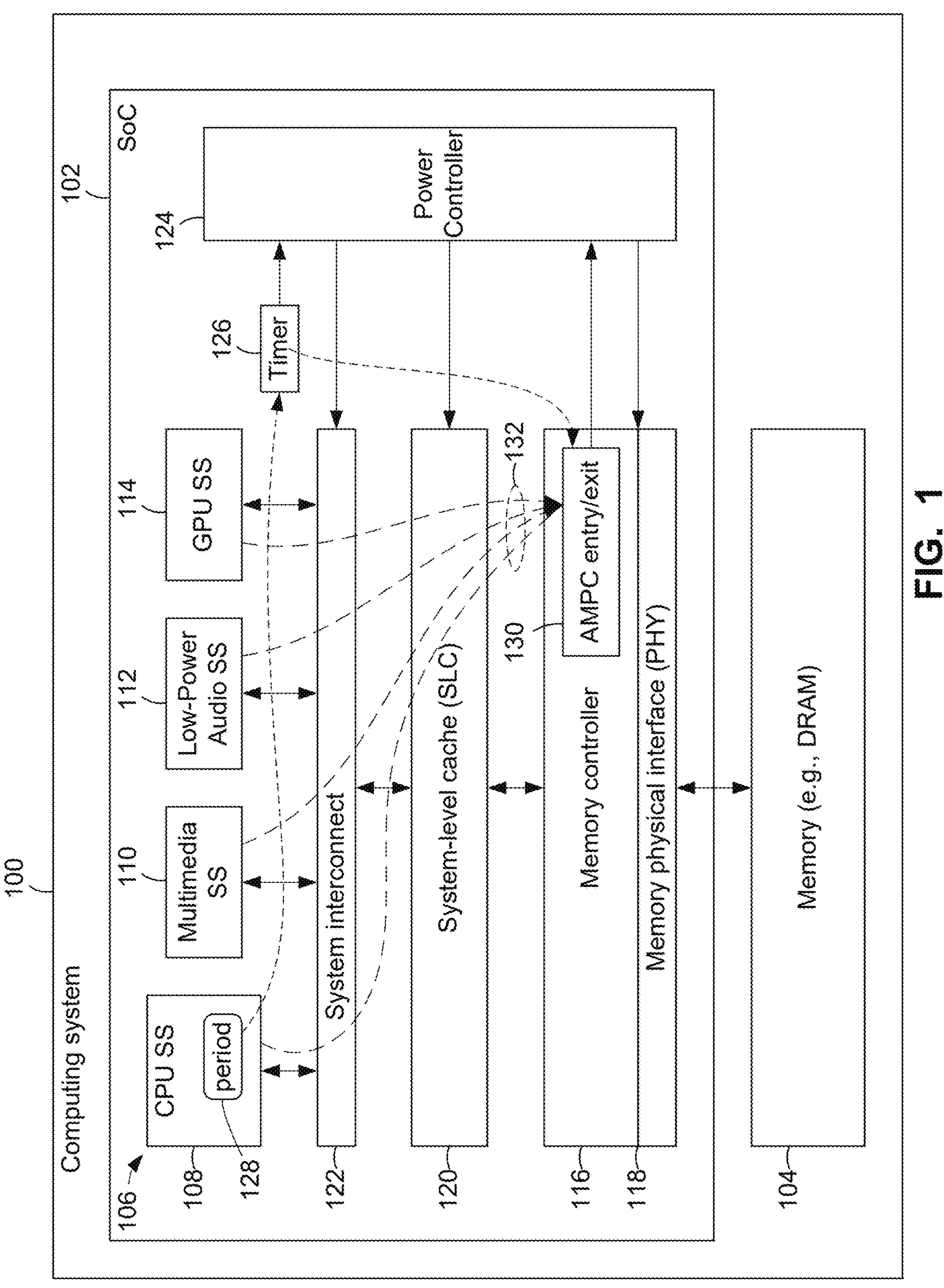
FIG. 1 is a block diagram of a system for power control in a computing device, in accordance with exemplary embodiments.

As shown in FIG. 1, in an illustrative or exemplary embodiment a computing system 100 may include a system-on-a-chip (SoC) 102 and a memory 104. The memory 104 may be a dynamic random access memory (DRAM). Although in the illustrated example the memory 104 is external to the SoC 102, in other examples (not shown) such a memory may be internal to (i.e., included in) such an SoC. The SoC 102 may include any number of processing subsystems 106, such as, for example, a central processing unit (CPU) subsystem 108, a multimedia subsystem 110, a low-power audio subsystem 112, a graphics processing unit (GPU) subsystem 114, etc. The SoC 102 may further include a memory controller 116, which may have (or be integrated with) a memory physical interface (PHY) 118. The SoC 102 may still further include a system-level cache (SLC) 120, sometimes also referred to as a last-level cache or LLC. The SoC 102 may also include a system interconnect 122. The system interconnect 122 may function analogously to a bus, providing data communication among the foregoing components. Although not shown, the system interconnect 122 may include a queue feature that buffers the communication packets.

In addition to the foregoing components, the SoC 102 may include a power controller 124. The power controller 124 may be configured to control one or more power supply rails through which power is supplied to components such as the memory controller 116 and memory physical interface 118, the SLC 120, the system interconnect 122, and the various processing subsystems 106. Although in the illustrated example the power controller 124 is included in the SoC 102, in other examples (not shown) such a power controller may be separate from such an SoC.

Any of the subsystems 106 may access the memory 104, i.e., perform write transactions to store data in the memory 104 or read transactions to retrieve data from the memory 104. The solutions described herein relate to exemplary use cases in which a subsystem's accesses of the memory 104 are periodic. That is, the subsystem 106 accesses the memory 104 at a rate or period for the duration of the use case or for an extended interval during the use case. For example, a use case may relate to processing a data stream and rendering the processed data in the form of an image on a screen (not shown). An example of such a use case may be a so-called "extended reality" or "XR" application, in which images are collected from a camera (not shown) and rendered on a screen in real time in combination with other data. In such an example, the CPU subsystem 108 may obtain data from a camera, process the data (e.g., generating metadata), and store the data in the memory 104. In performing this processing, the CPU subsystem 108 may access the memory 104 for a time interval, after which the CPU subsystem 108 may become inactive or quiescent for another time interval, with these successive intervals of activity (i.e., memory access) and inactivity (i.e., no memory access) continuing in a periodic manner while the XR application is in use. Meanwhile, in the time interval during which the CPU subsystem 108 has become inactive, the multimedia subsystem 110 or the GPU subsystem 114 may be reading the data from the memory 104, utilizing the SLC 120, in preparation for rendering the image on a screen. Or, in an alternative example, the low-power audio subsystem 112 may be performing, for example, voice processing on data read from the memory 104 into the SLC 120.

More generally, during the time interval in which a first one of the subsystems 106, such as the CPU subsystem 108 in this example, is inactive (i.e., not accessing the memory 104), a second one of the subsystems 106 (or other such subsystem) may be accessing data in the SLC 120. If the SLC 120, memory controller 116, and memory physical interface 118 all remain powered during the time intervals in which the CPU subsystem 108 is inactive, power is consumed and computing device runtime may be reduced. The solutions described herein may reduce power consumption, extend device runtime, or provide other advantages, while enabling such a second client to continue accessing the SLC 120 during intervals in which a first client is inactive (i.e., not accessing the memory 104).

Timer circuitry 126 may be included and configured to time a periodic time interval (which may also be referred to as the period). This periodic time interval may be determined in any manner. For example, one of the subsystems 106 that operates with respect to the memory 106 in a periodic pattern of activity (i.e., memory access) and inactivity (i.e., no memory access) may provide (e.g., under control of software) the period 128 or periodic time interval to the timer circuitry 126. The periodic time interval may be associated with the use case. For example, when the CPU subsystem 108 begins executing an XR application as described above, the CPU subsystem 108 may provide the associated period 128 or periodic time interval to the timer circuitry 126. In some examples, there may be multiple applications or use cases that the CPU subsystem 108 is capable of executing, and the period 128 associated with one use case may be different from the period 128 associated with another use case.

An autonomous memory power collapse (AMPC) entry/exit controller 130 may be included (e.g., in the memory controller 116). The power control methods described herein, which relate to periodic memory access use cases and employ a timer, may operate autonomously or independently of other power control methods. The AMPC entry/exit controller 130 may be configured to control the entry of memory controller components into a collapsed-power state and exit of those components from the collapsed-power state based on the output of the timer circuitry 126. As the reduction in power rail voltage is not instantaneous, the term "collapse" may be used. Nevertheless, a reference herein to collapse of a power rail means disconnecting or removing the power supplied to a component.

Figure 2:
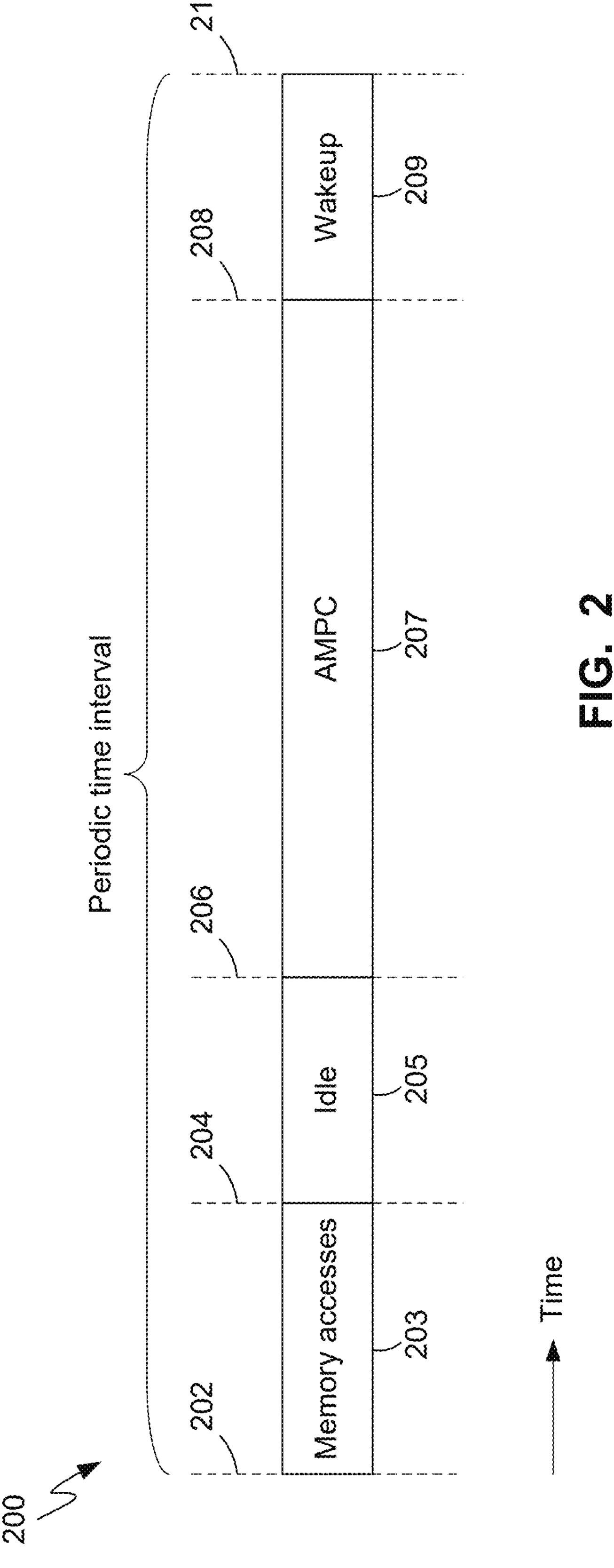
FIG. 2 is a timing diagram illustrating an aspect of power control in a computing device, in accordance with exemplary embodiments.

In FIG. 2, a timeline 200 illustrates an example of AMPC operation. At a time 202, the timer circuitry 126 (FIG. 1) may begin timing the above-described periodic time interval. Also at the time 202, the CPU subsystem 108 (FIG. 1) may begin accessing the memory 104 (FIG. 1).

At a later time 204, the CPU subsystem 108 (FIG. 1) may end or suspend such accesses of the memory 104. That is, between the time 202 and the time 204 the CPU subsystem 108 may be accessing the memory 104, which may be referred to as a memory access state 203 or active state. Between the time 204 and a time 206 the CPU subsystem 108 may be idle or inactive, i.e., not accessing the memory 104, which may be referred to as an idle state 205.

At the time 206, an output of the timer circuitry 126 (FIG. 1) may indicate that a first portion of the periodic time interval has elapsed. The power controller 124 (FIG. 1) and the AMPC entry/exit controller 130 (FIG. 1) may be configured to receive such an indication from the timer circuitry 126. When this first portion of the periodic time interval has elapsed, the power controller 124 may collapse one or more power rails supplying the memory controller 116 (FIG. 1) and the memory controller physical interface 118 (FIG. 1) while continuing to maintain in a powered state one or more other power rails supplying the system-level cache 120 (FIG. 1). This state of operation, in which the power rails supplying the memory controller 116 and memory controller physical interface 118 are collapsed yet the power rails supplying the system-level cache 120 remain powered, may be referred to as the AMPC state 207. The power controller 124 may collapse the one or more power rails supplying the memory controller 116 and the memory controller physical interface 118 after the memory controller 116 places the memory 104 in a self-refresh mode. In self-refresh mode, the memory 104 (i.e., DRAM) refreshes its storage array independently of the memory controller 116 and its associated physical interface 118. In the illustrated example, the AMPC state 207 extends from the time 206 to a time 208.

As the system-level cache 120 remains powered during the AMPC state 207, other processing subsystems 106 (FIG. 1) may continue to access the system-level cache 120 during the AMPC state 207. Note that in the AMPC state 207, the power controller 124 (FIG. 1) may also collapse one or more power rails supplying the then-idle processor, such as the CPU subsystem 108 in the example described above. As described above, in one example or exemplary use case, such other (or second) processing subsystem 106 may read data from the system-level cache 120 and render an image on a screen (not shown) using the data.

At the time 208 the timer circuitry 126 (FIG. 1) may indicate that it is time to begin waking up the memory-related components that were powered down during the AMPC state. In the illustrated example, the "wakeup" interval 209 begins at the time 208 and ends at a time 210. The wakeup interval 209 may be the amount of time needed for the processing subsystem 106 that continues to access the system-level cache 120 during the AMPC state 207 to complete such accesses. In the above-described example or exemplary use case, the wakeup interval 209 may be sufficient for the processing subsystem 106 that has been reading data from the system-level cache 120 and rendering an image using that data to complete reading that data and rendering that image before the next memory access state of the next periodic time interval (not shown) begins.

Providing the wakeup interval 209, i.e., beginning to wake up or restore the power in advance of the beginning of the next periodic time interval, may provide advantages or benefits in addition to the above-described benefit of allowing the other processing subsystem 106 to complete its accessing of the system-level cache 120. Such additional benefits may include avoiding so-called "head of line blocking." The term "line" refers to a command queue or buffer (not separately shown), which may be included in the system interconnect 122 (FIG. 1). When power is restored to the CPU subsystem 108 (FIG. 1), it may begin sending memory access commands even before the memory 104 is ready to respond (because the memory controller 116 is not yet powered up), and those memory access commands could accumulate in the buffer or queue of the system interconnect 122, potentially blocking other commands. The early wake-up provided by the wakeup interval 209 may enable the memory controller 116 and memory physical interface 118 to become powered up and ready by the time the CPU subsystem 108 begins sending memory access commands.

In the illustrated example, the periodic time interval that is timed by the timer circuitry 126 (FIG. 1) may begin at the time 202 and end at the time 210. Because the time interval is periodic, at the time 210 the operations described above beginning at the time 202 repeat. That is, the timer circuitry 126 may again begin timing the periodic time interval, and the CPU subsystem 108 (FIG. 1) may again begin accessing the memory 104 (FIG. 1). As noted above, by the time 210 at which the CPU subsystem 108 again requires access to the memory 104, another subsystem that has been accessing the system-level cache 120 will have completed those accesses.

Figure 3:
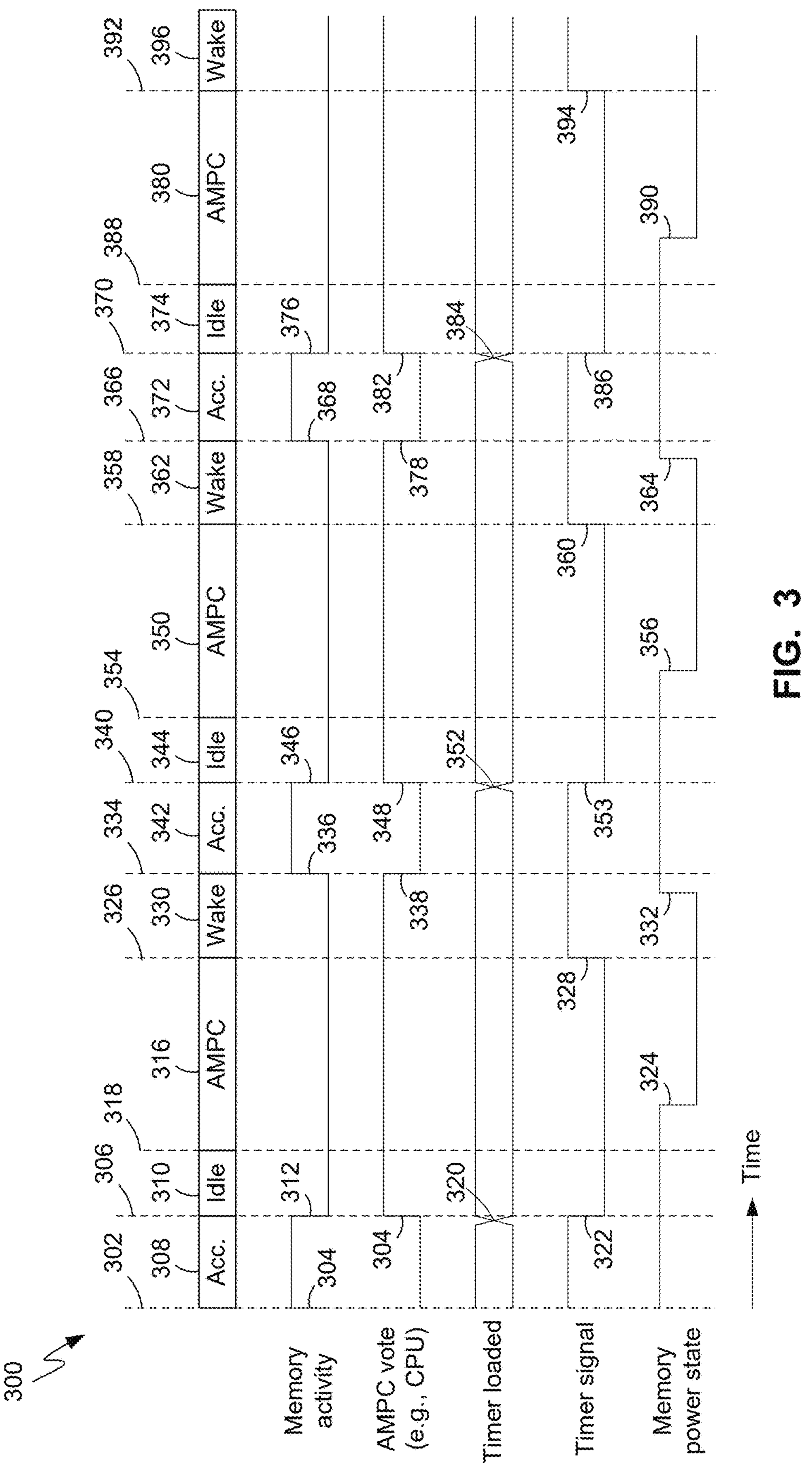
FIG. 3 is another timing diagram illustrating aspects of a power control in a computing device, in accordance with exemplary embodiments.

In FIG. 3, a timeline 300 further illustrates an example of AMPC-related aspects of operation of the above-described system 100 (FIG. 1). The timeline 300 indicates events or actions over successive periodic time intervals. For illustrative purposes, the timeline 300 spans three successive time intervals, but it should be understood that such periodic time intervals may continue indefinitely, so long as the use case (e.g., execution of an application involving periodic memory accesses) continues.

At a time 302, a first one of the subsystems 106 (FIG. 1), such as, for example, the CPU subsystem 108, may begin accessing the memory 104, as indicated by the memory activity transition 304 from an inactive state to an active state. At a time 306, this first memory access state 308 ends and a first idle state 310 begins, as indicated by the memory activity transition 312 from the active state to the inactive state.

Referring briefly again to FIG. 1, a voting or veto feature may be included in which each subsystem 106 may submit a vote or veto indication 132 to the AMPC entry/exit controller 130. The vote/veto feature may enable any subsystem 106 to request that the memory 104 not enter the next AMPC state but rather remain accessible to the subsystems 106. The term "vote" may be used in an example in which each subsystem 106 may assert its corresponding indication 132 to indicate that that subsystem 106 is amenable to entry into the next AMPC state, while the term "veto" may be used in an example in which each subsystem 106 may assert its corresponding indication 132 to indicate that that subsystem 106 is not amenable to entry into the next AMPC state, but the terms "vote" and "veto" may be used interchangeably. The AMPC entry/exit controller 130 may receive the indications 132 from the subsystems 106 and, if all subsystems 106 do not vote in favor of entry into the next AMPC state (or stated conversely, if any subsystem 106 vetoes entry into the next AMPC state), then the AMPC entry/exit controller 130 may refrain from proceeding with entry into the next AMPC state.

Returning to FIG. 3, subsystems may provide their vote (or veto) indications at any time. For example, at the time 306 the CPU subsystem 108 (FIG. 1) may provide an AMPC vote indication, as indicated by the vote transition 314 indicating that the CPU subsystem 108 is amenable to entry into the next AMPC state 316. Although other subsystems 106 may similarly provide their vote indications, they are not shown in FIG. 3 for purposes of clarity.

Also at the time 306, a timer loading 320 may occur. That is, the timer circuitry 126 (FIG. 1) may be loaded with a value representing the period time interval. As described above, the CPU subsystem 108, for example, may provide the periodic time interval based on the use case, such as the type of application being executed. As soon as the timer loading 320 occurs, a transition 322 of the timer signal that the timing circuitry 126 may provide to the AMPC entry/exit controller 130 (FIG. 1) may indicate that timing of the periodic time interval has begun. Note in the example illustrated in FIG. 3 that the idle state 310 begins when the timing of the periodic time interval begins. The AMPC state 316 may be entered when the idle state 310 ends (at the time 318).

In accordance with entry into the AMPC state 316, memory controller components (i.e., the memory controller 116 and its physical interface 118), may then be powered down, as indicated by the memory power state transition 324 from a powered-up state to a powered-down (i.e., collapsed power rail) state. Note that there may be some time lag between entry into the AMPC state 316 at the time 318 and the powering down of the memory controller components at the transition 324.

Although not shown in the example illustrated in FIG. 3, it should be noted that during the AMPC state 316 a second one of the subsystems 106 (i.e., other than the CPU subsystem 108 that is inactive during that AMPC state 316) may continue to access the system-level cache 120 (FIG. 1), which remains powered during that AMPC state 316.

At a time 326, a transition 328 of the timer signal indicates the beginning of the wakeup interval 330. During the wakeup interval 330, the memory controller components may be powered back up, as indicated by the memory power state transition 332.

At the end of the wakeup interval 330 at a time 334, the above-described actions may repeat for a second time (i.e., a second of the three periodic time intervals that the timeline 300 spans in the illustrated example). That is, the CPU subsystem 108 (FIG. 1) may again begin accessing the memory 104, as indicated by the memory activity transition 336 from the inactive state to the active state at the time 334. At a time 340, this second memory access state 342 ends and a second idle state 344 begins, as indicated by the memory activity transition 346 from the active state to the inactive state.

Also at the time 334, a vote transition 338 may indicate that the CPU subsystem 108 (FIG. 1) is not at that time amenable to entry into the next AMPC state 350 (indeed, the CPU subsystem 108 is actively accessing the memory 104). However, when the CPU subsystem 108 is finished accessing the memory 104 at the time 340, the vote transition 348 may indicate that the CPU subsystem 108 is now amenable to entry into the next AMPC state 350.

Also at the time 340, a timer loading 352 may occur. That is, the timer circuitry 126 (FIG. 1) may be loaded with a value representing the periodic time interval. In this example, the CPU subsystem 108 again provides the periodic time interval based on the continuing use case. As soon as the timer loading 352 occurs, a transition 353 of the timer signal may indicate that timing of the periodic time interval has begun. The AMPC state 350 may be entered when the idle state 344 ends at the time 354.

In accordance with entry into the AMPC state 350, the memory controller components may then be powered down, as indicated by the memory power state transition 356. Although not shown in the example, it should be noted that during the AMPC state 350 a second one of the subsystems 106 (i.e., other than the CPU subsystem 108 that is inactive during that AMPC state 350) may continue to access the system-level cache memory 120 (FIG. 1), which remains powered during that AMPC state 350.

At a time 358, a transition 360 of the timer signal indicates the beginning of the wakeup interval 362. During the wakeup interval 362, the memory controller components may be powered back up, as indicated by the memory power state transition 364.

At the end of the wakeup interval 362 at a time 366, the above-described actions may repeat (for a third time in this example). That is, the CPU subsystem 108 (FIG. 1) may begin accessing the memory 104, as indicated by the memory activity transition 368 from the inactive state to the active state at the time 366. At a time 370, this third memory access state 372 ends and a third idle state 374 begins, as indicated by the memory activity transition 376 from the active state to the inactive state.

Also at the time 366, a vote transition 378 may indicate that the CPU subsystem 108 is not at that time amenable to entry into the next AMPC state 380. However, when the CPU subsystem 108 is finished accessing the memory 104 at the time 370, the vote transition 382 may indicate that the CPU subsystem 108 is now amenable to entry into the next AMPC state 350.

Also at the time 370, a timer loading 384 may occur. That is, the timer circuitry 126 (FIG. 1) may be loaded with a value representing the periodic time interval. In this example, the CPU subsystem 108 again provides the periodic time interval based on the continuing use case. As soon as the timer loading 384 occurs, a transition 386 of the timer signal may indicate that timing of the periodic time interval has begun. The AMPC state 380 may be entered when the idle state 374 ends at the time 388. In accordance with entry into the AMPC state 380, the memory controller components may then be powered down, as indicated by the memory power state transition 390.

At a time 392, a transition 394 of the timer signal indicates the beginning of the wakeup interval 396. Although only the above-described three successive periodic time intervals are shown in the timeline 300, it should be understood that the sequence of memory access, idle, AMPC and wakeup that occur in each periodic time interval may repeat indefinitely, i.e., for any number of such periodic time intervals, so long as the use case continues.

Figure 4:
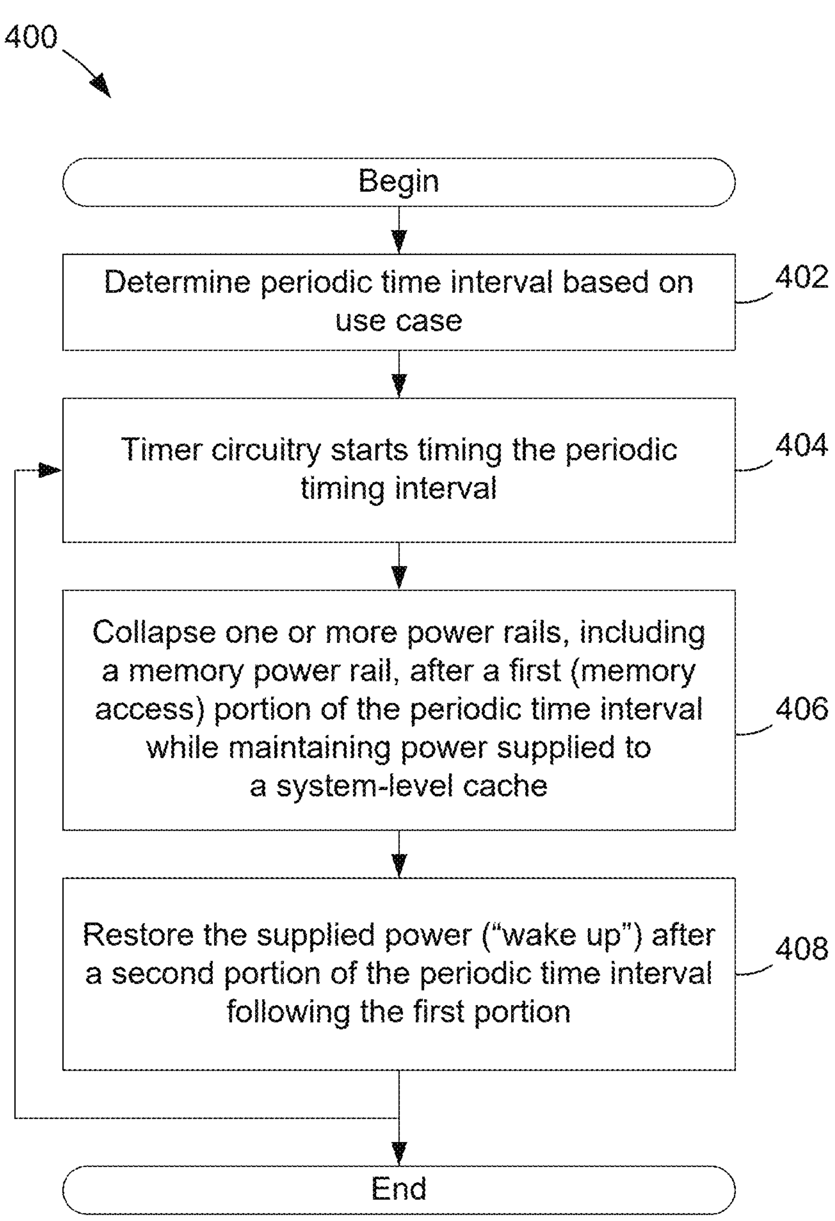
FIG. 4 is a flow diagram illustrating a method for power control in a computing device, in accordance with exemplary embodiments.

In FIG. 4, a method 400 for power control in a computing device is illustrated in flow diagram form. As indicated by block 402, a periodic time interval associated with memory access by a first subsystem, such as, for example, a CPU subsystem, may be determined based on a use case. Different periodic time intervals may be associated with different use cases. The subsystem may determine the periodic time interval and provide it to timer circuitry.

As indicated by block 404, the timer circuitry may start timing the periodic time interval. A first portion of each periodic time interval may include a memory access state. A second portion of each periodic time interval may include a low-power or collapsed power rail state, which may also be referred to as an AMPC state.

As indicated by block 406, after the memory access state or phase ends, one or more power rails, including a power rail supplying memory controller circuitry (e.g., a memory controller and associated physical interface), may be collapsed. Nevertheless, while the power rail supplying the memory controller circuitry is collapsed, power supplied to a system-level cache may be preserved or maintained. Accordingly, a second subsystem may continue to access the system-level cache even while the memory controller circuitry is not being supplied with power. Power control circuitry, such as the above-described power controller 124 (FIG. 1), may perform or control this collapse of one or more power rails, in some examples in combination with other control circuitry, such as the above-described AMPC entry/exit controller 110.

As indicated by block 408, after the second portion of the periodic time interval that follows the first portion of the periodic time interval, power may be restored or again supplied to the memory controller circuitry. This may be referred to as "waking up" the memory controller circuitry. Power control circuitry may perform or control this restoration of the one or more power rails. In some examples of block 408, restoring the power may begin in advance of a beginning of the next periodic time interval by an amount of time associated with continued access of the system-level cache by the second subsystem.

Figure 5:
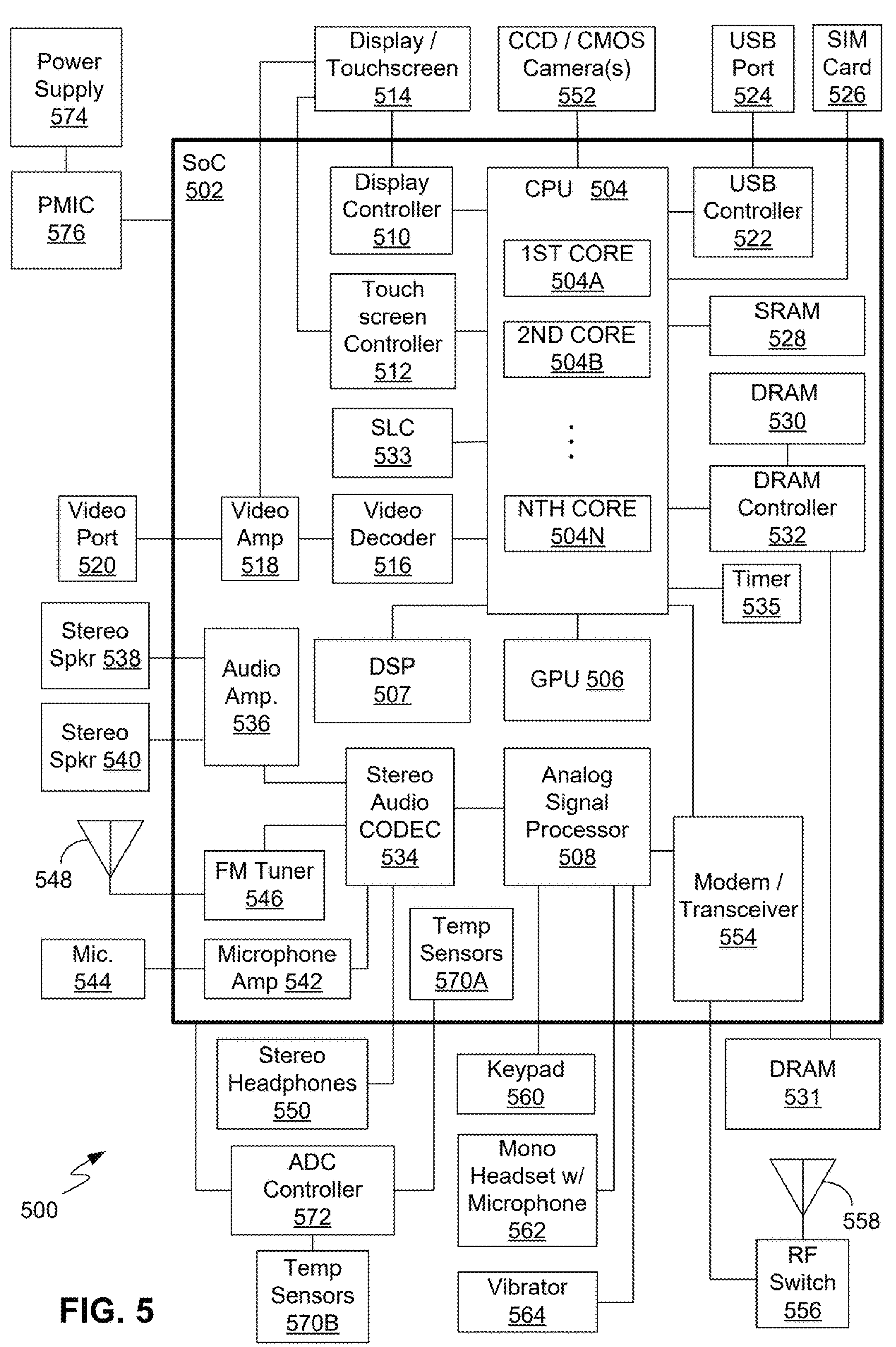
FIG. 5 is a block diagram of a portable computing device having a memory power control feature, in accordance with exemplary embodiments.

FIG. 5 illustrates an example of a portable computing device (PCD) 500, in which exemplary embodiments of systems, methods, and other examples of the above-described power control may be provided. The PCD 500 may be, for example, a laptop or palmtop computer, cellular telephone or smartphone, personal digital assistant, navigation device, smartbook, portable game console, satellite telephone, automotive device, Internet-of-Things (IoT) device, etc.

The PCD 500 may include an SoC 502. The SoC 502 may include a CPU 504, a GPU 506, a digital signal processor (DSP) 507, an analog signal processor 508, a modem/modem subsystem 554, or other processors. The CPU 504 may include one or more CPU cores, such as a first CPU core 504A, a second CPU core 504B, etc., through an Nth CPU core 504N. The CPU 504 or cores 504A-504N may be examples of the CPU 108 described above with regard to FIG. 1. The GPU 506 and such other processors may be examples of other processors 106 (FIG. 1).

A display controller 510 and a touch-screen controller 512 may be coupled to the CPU 504. A touchscreen display 514 external to the SoC 502 may be coupled to the display controller 510 and the touch-screen controller 512. The PCD 500 may further include a video decoder 516 coupled to the CPU 504. A video amplifier 518 may be coupled to the video decoder 516 and the touchscreen display 514. A video port 520 may be coupled to the video amplifier 518. A universal serial bus (USB) controller 522 may also be coupled to the CPU 504, and a USB port 524 may be coupled to the USB controller 522. A subscriber identity module (SIM) card 526 may also be coupled to the CPU 504.

The CPU 504 may be coupled to one or more memories, with which the CPU 504 or other processors may initiate memory transactions. The one or more memories may include both volatile and non-volatile memories. Examples of volatile memories may include static random access memory (SRAM) 528 and dynamic random access memory (DRAM) 530 and 531. Such memories may be internal to the SoC 502, as in the case of the SRAM 528 and DRAM 530, or external to the SoC 502, as in the case of the DRAM 531. A DRAM controller 532 coupled to the CPU 504 may control the writing of data to, and reading of data from, the DRAMs 530 and 531.

The DRAM controller 532 may be an example of the above-described memory controller 116 and memory physical interface 118. Although not shown in FIG. 5 for purposes of clarity, the DRAM controller 532 may be configured to include an AMPC entry/exit controller 130 (FIG. 1). The DRAMs 530 and 531 may be examples of the above-described memory 104 (FIG. 1). A system-level cache (SLC) 533 may also be included and may be an example of the above-described SLC 120 (FIG. 1). Further, timer circuitry 535 may be included and may be an example of the above-described timer circuitry 126.

A stereo audio CODEC 534 may be coupled to the analog signal processor 508. Further, an audio amplifier 536 may be coupled to the stereo audio CODEC 534. First and second stereo speakers 538 and 540, respectively, may be coupled to the audio amplifier 536. In addition, a microphone amplifier 542 may be coupled to the stereo audio CODEC 534, and a microphone 544 may be coupled to the microphone amplifier 542. A frequency modulation (FM) radio tuner 546 may be coupled to the stereo audio CODEC 534. An FM antenna 548 may be coupled to the FM radio tuner 546. Further, stereo headphones 550 may be coupled to the stereo audio CODEC 534. Other devices that may be coupled to the CPU 504 include one or more digital (e.g., CCD or CMOS) cameras 552.

The RF transceiver or modem subsystem 554 may be coupled to the analog signal processor 508 and the CPU 504. An RF switch 556 may be coupled to the modem subsystem 554 and an RF antenna 558. In addition, a keypad 560, a mono headset with a microphone 562, and a vibrator device 564 may be coupled to the analog signal processor 508.

The SoC 502 may have one or more internal or on-chip thermal sensors 570A and may be coupled to one or more external or off-chip thermal sensors 570B. An analog-to-digital converter controller 572 may convert voltage drops produced by the thermal sensors 570A and 570B to digital signals. A power supply 574 and a power management integrated circuit (PMIC) 576 may supply power to the SoC 502. The PMIC 576 may be an example of the above-described power controller 124 (FIG. 1).

Implementation examples are described in the following numbered clauses.

1. A method for power control in a computing device, comprising:

timing, by timer circuitry, a periodic time interval;

collapsing, by power control circuitry, at least one power rail including a memory power rail supplying power to memory controller circuitry after a first portion of the periodic time interval associated with access of a memory by a first processor; and restoring, by the power control circuitry, the power supplied to the memory controller circuitry after a second portion of the periodic time interval following the first portion.

2. The method of clause 1, wherein restoring the power begins in advance of a beginning of a next periodic time interval by an amount of time associated with continued access of the system-level cache by a second processor.

3. The method of clause 1 or 2, further comprising:

receiving a veto indication from a processor within an idle time interval following the first portion of the period time interval and before collapsing the at least one power rail; and refraining from collapsing the at least one power rail during the periodic time interval when the veto indication is received.

4. The method of any of clauses 1-3, wherein collapsing the at least one power rail comprises collapsing a processor power rail supplying power to the first processor before collapsing the memory power rail supplying power to the memory controller circuitry.

5. The method of any of clauses 1-4, further comprising setting the memory to a self-refresh mode while the memory power rail is collapsed.

6. The method of any of clauses 1-5, wherein the periodic time interval is based on a current use case of a plurality of use cases.

7. The method of clause 1, wherein during collapsing the power control circuitry maintains power supplied to a system-level cache associated with access by a second processor.

8. A system for power control in a computing device, comprising:

timer circuitry configured to time a periodic time interval; and power control circuitry configured to collapse at least one power rail including a memory power rail supplying power to memory controller circuitry after a first portion of the periodic time interval associated with access of a memory by a first processor, wherein the power control circuitry is further configured to restore the power supplied to the memory controller circuitry after a second portion of the periodic time interval following the first portion.

9. The system of clause 8, wherein the power control circuitry is configured to restore the power beginning in advance of a beginning of a next periodic time interval by an amount of time associated with continued access of the system-level cache by the second processor.

10. The system of clause 8 or 9, wherein the power control circuitry is further configured to:

receive a veto indication from a processor within an idle time interval following the first portion of the period time interval and before collapsing the at least one power rail; and refrain from collapsing the at least one power rail during the periodic time interval when the veto indication is received.

11. The system of any of clauses 8-10, wherein the power control circuitry is configured to collapse a processor power rail supplying power to the first processor before collapsing the memory power rail supplying power to the memory controller circuitry.

12. The system of any of clauses 8-11, wherein the memory controller circuitry is configured to set the memory to a self-refresh mode while the memory power rail is collapsed.

13. The system of any of clauses 8-12, wherein the periodic time interval is based on a current use case of a plurality of use cases.

14. The system of any of clauses 8-13, wherein during the collapse of the least one power rail, the power control circuitry maintains power supplied to a system-level cache associated with access by a second processor.

15. A system-on-a-chip (SoC), comprising:

a plurality of processors including a first processor and a second processor;

a system-level cache;

timer circuitry configured to time a periodic time interval; and power control circuitry configured to collapse at least one power rail including a memory power rail supplying power to memory controller circuitry after a first portion of the periodic time interval associated with access of a memory by a first processor, wherein the power control circuitry is further configured to restore the power supplied to the memory controller circuitry after a second portion of the periodic time interval following the first portion.

16. The SoC of clause 15, wherein the power control circuitry is configured to restore the power beginning in advance of a beginning of a next periodic time interval by an amount of time associated with continued access of the system-level cache by a second processor.

17. The SoC of clause 15 or 16, wherein the power control circuitry is further configured to:

receive a veto indication from a processor within an idle time interval following the first portion of the period time interval and before collapsing the at least one power rail; and refrain from collapsing the at least one power rail during the periodic time interval when the veto indication is received.

18. The SoC of any of clauses 15-18, wherein the power control circuitry is configured to collapse a processor power rail supplying power to the first processor before collapsing the memory power rail supplying power to the memory controller circuitry.

19. The SoC of any of clauses 15-18, wherein the memory controller circuitry is configured to set the memory to a self-refresh mode while the memory power rail is collapsed.

20. The SoC of any of clauses 15-19, wherein the periodic time interval is based on a current use case of a plurality of use cases.

Alternative embodiments will become apparent to one of ordinary skill in the art to which the invention pertains. Therefore, although selected aspects have been illustrated and described in detail, it will be understood that various substitutions and alterations may be made therein.

What is claimed is:

1. A method for power control in a computing device, comprising:

timing, by timer circuitry, a periodic time interval;

collapsing, by power control circuitry, at least one power rail including a memory power rail supplying power to memory controller circuitry after a first portion of the periodic time interval associated with access of a memory by a first processor; and restoring, by the power control circuitry, the power supplied to the memory controller circuitry after a second portion of the periodic time interval following the first portion.

2. The method of claim 1, wherein restoring the power begins in advance of a beginning of a next periodic time interval by an amount of time associated with continued access of the system-level cache by a second processor.

3. The method of claim 1, further comprising:

receiving a veto indication from a processor within an idle time interval following the first portion of the period time interval and before collapsing the at least one power rail; and refraining from collapsing the at least one power rail during the periodic time interval when the veto indication is received.

4. The method of claim 1, wherein collapsing the at least one power rail comprises collapsing a processor power rail supplying power to the first processor before collapsing the memory power rail supplying power to the memory controller circuitry.

5. The method of claim 1, further comprising setting the memory to a self-refresh mode while the memory power rail is collapsed.

6. The method of claim 1, wherein the periodic time interval is based on a current use case of a plurality of use cases.

7. The method of claim 1, wherein during collapsing the power control circuitry maintains power supplied to a system-level cache associated with access by a second processor.

8. A system for power control in a computing device, comprising:

timer circuitry configured to time a periodic time interval; and power control circuitry configured to collapse at least one power rail including a memory power rail supplying power to memory controller circuitry after a first portion of the periodic time interval associated with access of a memory by a first processor, wherein the power control circuitry is further configured to restore the power supplied to the memory controller circuitry after a second portion of the periodic time interval following the first portion.

9. The system of claim 8, wherein the power control circuitry is configured to restore the power beginning in advance of a beginning of a next periodic time interval by an amount of time associated with continued access of the system-level cache by a second processor.

10. The system of claim 8, wherein the power control circuitry is further configured to:

receive a veto indication from a processor within an idle time interval following the first portion of the period time interval and before collapsing the at least one power rail; and refrain from collapsing the at least one power rail during the periodic time interval when the veto indication is received.

11. The system of claim 8, wherein the power control circuitry is configured to collapse a processor power rail supplying power to the first processor before collapsing the memory power rail supplying power to the memory controller circuitry.

12. The system of claim 8, wherein the memory controller circuitry is configured to set the memory to a self-refresh mode while the memory power rail is collapsed.

13. The system of claim 8, wherein the periodic time interval is based on a current use case of a plurality of use cases.

14. The system of claim 8, wherein during the collapse of the least one power rail, the power control circuitry maintains power supplied to a system-level cache associated with access by a second processor.

15. A system-on-a-chip (SoC), comprising:

a plurality of processors including a first processor and a second processor;

a system-level cache;

timer circuitry configured to time a periodic time interval; and power control circuitry configured to collapse at least one power rail including a memory power rail supplying power to memory controller circuitry after a first portion of the periodic time interval associated with access of a memory by a first processor, wherein the power control circuitry is further configured to restore the power supplied to the memory controller circuitry after a second portion of the periodic time interval following the first portion.

16. The SoC of claim 15, wherein the power control circuitry is configured to restore the power beginning in advance of a beginning of a next periodic time interval by an amount of time associated with continued access of the system-level cache by a second processor.

17. The SoC of claim 15, wherein the power control circuitry is further configured to:

receive a veto indication from a processor within an idle time interval following the first portion of the period time interval and before collapsing the at least one power rail; and refrain from collapsing the at least one power rail during the periodic time interval when the veto indication is received.

18. The SoC of claim 15, wherein the power control circuitry is configured to collapse a processor power rail supplying power to the first processor before collapsing the memory power rail supplying power to the memory controller circuitry.

19. The SoC of claim 15, wherein the memory controller circuitry is configured to set the memory to a self-refresh mode while the memory power rail is collapsed.

20. The SoC of claim 15, wherein the periodic time interval is based on a current use case of a plurality of use cases.

* * * * *